United States Patent
Shin et al.

(10) Patent No.: US 9,184,956 B2
(45) Date of Patent: Nov. 10, 2015

(54) RELAY AND TERMINAL IN MULTI-PAIR TWO-WAY RELAY NETWORK AND COMMUNICATION METHOD THEREOF

(75) Inventors: Won Jae Shin, Yongin-si (KR); Jong Bu Lim, Yongin-si (KR); Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 744 days.

(21) Appl. No.: 13/563,887

(22) Filed: Aug. 1, 2012

(65) Prior Publication Data
US 2013/0039265 A1 Feb. 14, 2013

(30) Foreign Application Priority Data

Aug. 19, 2011 (KR) .................. 10-2011-0082511

(51) Int. Cl.
| H04L 27/00 | (2006.01) |
| H04B 7/155 | (2006.01) |
| H04B 7/08 | (2006.01) |
| H04L 25/03 | (2006.01) |
| H04B 7/06 | (2006.01) |

(52) U.S. Cl.
CPC ............ *H04L 27/00* (2013.01); *H04B 7/15542* (2013.01); *H04B 7/0617* (2013.01); *H04B 7/0639* (2013.01); *H04B 7/086* (2013.01); *H04L 25/03898* (2013.01)

(58) Field of Classification Search
CPC ...................................................... H04L 27/00
See application file for complete search history.

(56) References Cited

U.S. PATENT DOCUMENTS

| 2008/0013520 | A1 | 1/2008 | Liu et al. | |
| 2008/0165875 | A1* | 7/2008 | Mundarath et al. | 375/262 |
| 2010/0014453 | A1 | 1/2010 | Erkip et al. | |
| 2010/0195594 | A1* | 8/2010 | Seo et al. | 370/329 |
| 2011/0013552 | A1 | 1/2011 | Ali et al. | |
| 2011/0075752 | A1* | 3/2011 | Zheng et al. | 375/267 |
| 2011/0128905 | A1 | 6/2011 | Kawauchi et al. | |

FOREIGN PATENT DOCUMENTS

| JP | 2005-027265 A | 1/2005 |
| KR | 10-1029259 | 4/2011 |
| KR | 10-2011-0057890 A | 6/2011 |

* cited by examiner

*Primary Examiner* — Andrew Lai
*Assistant Examiner* — Sumitra Ganguly
(74) *Attorney, Agent, or Firm* — NSIP Law

(57) ABSTRACT

A relay and a terminal in a multi-pair two-way network and a communication method thereof is provided. A communication method of a relay of a network including K transmit-and-receive pairs including a plurality of terminals, with the relay including M antennas and each of the terminals including N antennas, including accessing a codebook including codewords, the codebook being configured to enable effective channels from the K transmit-and-receive pairs to the relay to be aligned in independent dimensions, respectively, when the K transmit-and-receive pairs transmit signals simultaneously, each of the effective channels being aligned based on one of the codewords, selecting one or more of the codewords indicating the effective channels from the K transmit-and-receive pairs to the relay, respectively, and transmitting information associated with the selected codewords to corresponding ones of the K transmit-and-receive pairs.

20 Claims, 7 Drawing Sheets

RELAY AND TERMINAL IN MULTI-PAIR TWO-WAY RELAY NETWORK AND COMMUNICATION METHOD THEREOF

CROSS-REFERENCE TO RELATED APPLICATIONS

This application claims the benefit under 35 U.S.C. §119(a) of Korean Patent Application No. 10-2011-0082511, filed on Aug. 19, 2011, in the Korean Intellectual Property Office, the entire disclosure of which is incorporated herein by reference for all purposes.

BACKGROUND

1. Field

The following description relates to a relay and a terminal in a multi-pair two-way network and a communication method thereof.

2. Description of Related Art

Systems have been developed that enable interaction and networking between users of devices configured to transmit and receive information over a variety of network types. To this point, 1% of all devices existing globally are able to connect to other devices over a network. However, technology development and device integration have enabled an expectation of further development to implement vast networks utilized by smart phones, sensor devices, and the like requiring connectivity to other networked devices of varied functionality. Further, many users expect to use these types of communication devices to readily share content, perform synchronization and output, and utilize various applications and games through direct contact with other networked devices of varied functionality.

One of the conventional approaches to enabling this direct contact via a network is through a multi-pair two-way relay network. Here, a two-way relay channel is a channel through which two terminals or users exchange data using a relay. The multi-pair two-way relay channel is two-way relay channels formed by a plurality of nodes.

A conventional scheme used to perform data transmission via the multi-pair two-way relay channel is a decoding and forward and amplified and forward scheme. As an example, an environment is assumed in which three pairs of two-way relay channels are superposed.

When a half duplex is assumed to be a transmission scheme, twelve time slots are required to exchange all data. In this example, a network capacity, i.e., a transmission capacity of a network, is inversely proportional to a number of time slots. Therefore, the transmission capacity of the network is reduced to be inversely proportional to the number of users. A decrease in the transmission capacity may occur since different resources, for example, different time slots, are used for each transmission, as opposed to using an appropriate interference management scheme.

When a network coding is assumed in a two-way relay of a unit-pair, a time slot decreases to half of the time slot. However, the unit-pair uses resources with other pairs by dividing the resources. As a result, six time slots may be expanded in the two-way relay of the unit-pair. The six time slots are used since the transmission capacity of the network decreases to be inversely proportional to the number of the terminals or users. Therefore, when the number of terminals or users increases rapidly, the transmission efficiency in the network decreases.

As a result, a wireless access technology is desired that supports direct communication among devices, or device-to-device (D2D) communication that performs data transmission using a multi-hop structure, in addition to a cellular communication based on a conventional infrastructure. In addition, a method is desired that supports this type of direct communication to effectively communicate using a two-way relay formed by multiple nodes.

SUMMARY

In one general aspect, there is provided a communication method of a relay of a network including K transmit-and-receive pairs including a plurality of terminals, the relay including M antennas, each of the terminals including N antennas, the method including accessing a codebook including codewords, the codebook being configured to enable effective channels from the K transmit-and-receive pairs to the relay to be aligned in independent dimensions, respectively, when the K transmit-and-receive pairs transmit signals simultaneously, each of the effective channels being aligned based on one of the codewords, selecting one or more of the codewords indicating the effective channels from the K transmit-and-receive pairs to the relay, respectively, and transmitting information associated with the selected codewords to corresponding ones of the K transmit-and-receive pairs.

The general aspect of the communication method of the relay may further provide allocating identifications (IDs) corresponding to the K transmit-and-receive pairs, respectively.

The general aspect of the communication method of the relay may further provide that the selected codewords are different from each other for each ID.

The general aspect of the communication method of the relay may further provide determining reception beamforming vectors with respect to the corresponding ones of the K transmit-and-receive pairs, based on the information associated with the selected codewords.

The general aspect of the communication method of the relay may further provide that the determining of the reception beamforming vectors includes determining reception beamforming vectors of the terminals of the corresponding ones of the K transmit-and-receive pairs, based on an assumption that effective channels obtained by applying the reception beamforming vectors to the terminals are identical to each other.

The general aspect of the communication method of the relay may further provide transmitting network coded signals for the corresponding ones of the K transmit-and-receive pairs, simultaneously.

The general aspect of the communication method of the relay may further provide defining the codebook, and transferring information associated with the codebook to the terminals.

The general aspect of the communication method of the relay may further provide that signals among the terminals of one of the K transmit-and-receive pairs are aligned in the same independent dimension.

In another general aspect, there is provided a communication method of a terminal of a plurality of terminals in a network including K transmit-and-receive pairs and a relay including M antennas, the K transmit-and-receive pairs including the plurality of terminals, each of the terminals including N antennas, the method including receiving, from the relay, information associated with a selected one of a plurality of codewords indicating an effective channel from a corresponding one of the K transmit-and-receive pairs to the relay, accessing a codebook including the plurality of codewords, the codebook being configured to enable effective channels from the K transmit-and-receive pairs to the relay to be aligned in independent dimensions, respectively, each of the effective channels being aligned based on one of the plurality of codewords, recognizing information associated with one of the independent dimensions corresponding to the information associated with the selected one of the plurality of codewords, based on the codebook, estimating a channel of the terminal using a pilot signal received from the relay, and calculating a transmission beamforming vector based on the information associated with the one of the independent dimensions and information associated with the estimated channel.

The general aspect of the communication method of the terminal may further provide receiving, from the relay, information associated with identification (ID) allocated to correspond to one of the K transmit-and-receive pairs including the one of the plurality of terminals.

In yet another general aspect, there is provided a non-transitory computer readable recording medium storing a program to implement the communication method of a relay of a network including K transmit-and-receive pairs including a plurality of terminals, the relay including M antennas, each of the terminals including N antennas.

In still another general aspect, there is provided a relay of a network including K transmit-and-receive pairs including a plurality of terminals, the relay including M antennas, each of the terminals including N antennas, the relay including an access unit configured to access a codebook including codewords, the codebook being configured to enable effective channels from the K transmit-and-receive pairs to the relay to be aligned in independent dimensions, respectively, when the K transmit-and-receive pairs transmit signals simultaneously, each of the effective channels being aligned based on one of the codewords, a selecting unit configured to select one or more of the codewords indicating the effective channels from the K transmit-and-receive pairs to the relay, respectively, and a transmitting unit configured to transmit information associated with the selected codewords to corresponding ones of the K transmit-and-receive pairs.

The general aspect of the relay may further provide an identification (ID) allocating unit configured to allocate IDs corresponding to the K transmit-and-receive pairs, respectively.

The general aspect of the relay may further provide that the selected codewords are different from each other for each ID.

The general aspect of the relay may further provide a reception beamforming vector determining unit configured to determine reception beamforming vectors with respect to the corresponding ones of the K transmit-and-receive pairs, based on the information associated with the selected codewords.

The general aspect of the relay may further provide that the reception beamforming vector determining unit is further configured to determine reception beamforming vectors of the terminals of the corresponding ones of the K transmit-and-receive pairs, based on an assumption that effective channels obtained by applying the reception beamforming vectors to the terminals are identical to each other.

The general aspect of the relay may further provide that the transmitting unit is further configured to transmit network coded signals for the corresponding ones of the K transmit-and-receive pairs, simultaneously.

The general aspect of the relay may further provide that signals among the terminals of one of the K transmit-and-receive pairs are aligned in the same independent dimension.

In a further general aspect, there is provided a terminal of a plurality of terminals of a network including K transmit-and-receive pairs and a relay including M antennas, the K transmit-and-receive pairs including the plurality of terminals, each of the terminals including N antennas, the terminal including a receiving unit configured to receive, from the relay, information associated with a selected one of a plurality of codewords indicating an effective channel from a corresponding one of the K transmit-and-receive pairs to the relay, an access unit configured to access a codebook including the plurality of codewords, the codebook being configured to enable effective channels from the K transmit-and-receive pairs to the relay to be aligned in independent dimensions, respectively, each of the effective channels being aligned based on one of the plurality of codewords, a recognizing unit configured to recognize information associated with one of the independent dimensions corresponding to the information associated with the selected one of the plurality of codewords, based on the codebook, a channel estimator configured to estimate a channel of the terminal based on a pilot signal received from the relay, and a transmission beamforming vector calculator configured to calculate a transmission beamforming vector based on the information associated with the one of the independent dimensions and information associated with the estimated channel.

The general aspect of the terminal may further provide that the receiving unit is further configured to receive, from the relay, information associated with identification (ID) allocated to correspond to one of the K transmit-and-receive pairs comprising the terminal of the plurality of terminals.

Other features and aspects may be apparent from the following detailed description, the drawings, and the claims.

Figure 1:
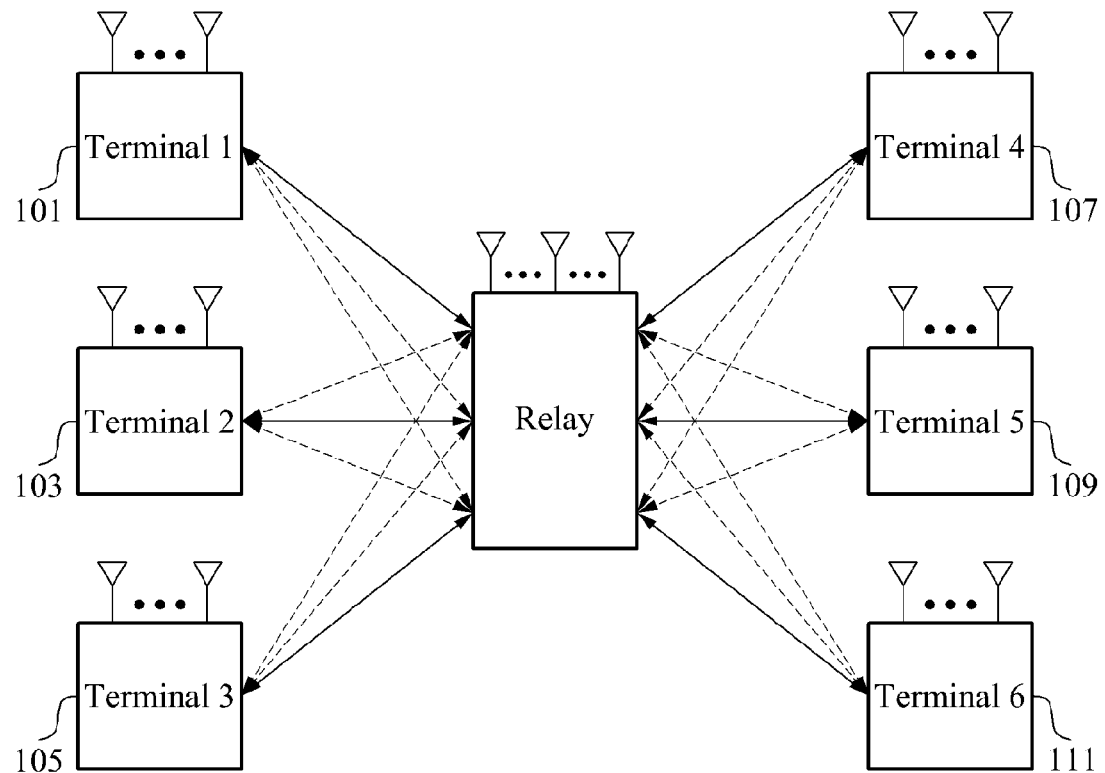
FIG. 1 is a diagram illustrating, according to an example embodiment, a network including a plurality of transmit-and-receive pairs and a relay including a plurality of antennas.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. In addition, descriptions of well-known functions and constructions may be omitted for increased clarity and conciseness.

FIG. 1 is a diagram illustrating, according to an example embodiment, a network 100 including a plurality of transmit-and-receive pairs and a relay 120 including a plurality of antennas. In a multi-part two-way relay network 100 of the example embodiment, all transmission and reception pairs share resources in the relay 120 having a plurality of antennas. As a result, the transmission capacity of the network 100 is not inversely proportional to the number of terminals 101, 103, 105, 107, 109, and 111.

Referring to the example embodiment illustrated in FIG. 1, a first terminal 101, a second terminal 103, a third terminal 105, a fourth terminal 107, a fifth terminal 109, and a sixth terminal 111 exchange signals with each other through a relay 120 in the network 100. Here, the first terminal 101 exchanges signals or data with the fourth terminal 107, the second terminal 103 exchanges signals with the fifth terminal 109, and the third terminal 105 exchanges signals with the sixth terminal 111. In FIG. 1, straight lines connecting the relay 120 and each terminal denote signals, and dotted lines connecting the relay 120 and each terminal denote interference.

In FIG. 1, the three pairs of terminals 101 and 107, 103 and 109, and 105 and 111 exchange data via the relay 120 in the network 100 simultaneously. As a result, three transmit-and-receive pairs 101 and 107, 103 and 109, and 105 and 111 are formed by grouping the three pairs of terminals 101 and 107, 103 and 109, and 105 and 111. In this example, a number of antennas (N) of each terminal 101, 103, 105, 107, 109, and 111 included in transmit-and-receive pairs 101 and 107, 103 and 109, and 105 and 111 is three, and a number of antennas (M) included in the relay 120 is three.

Figure 2:
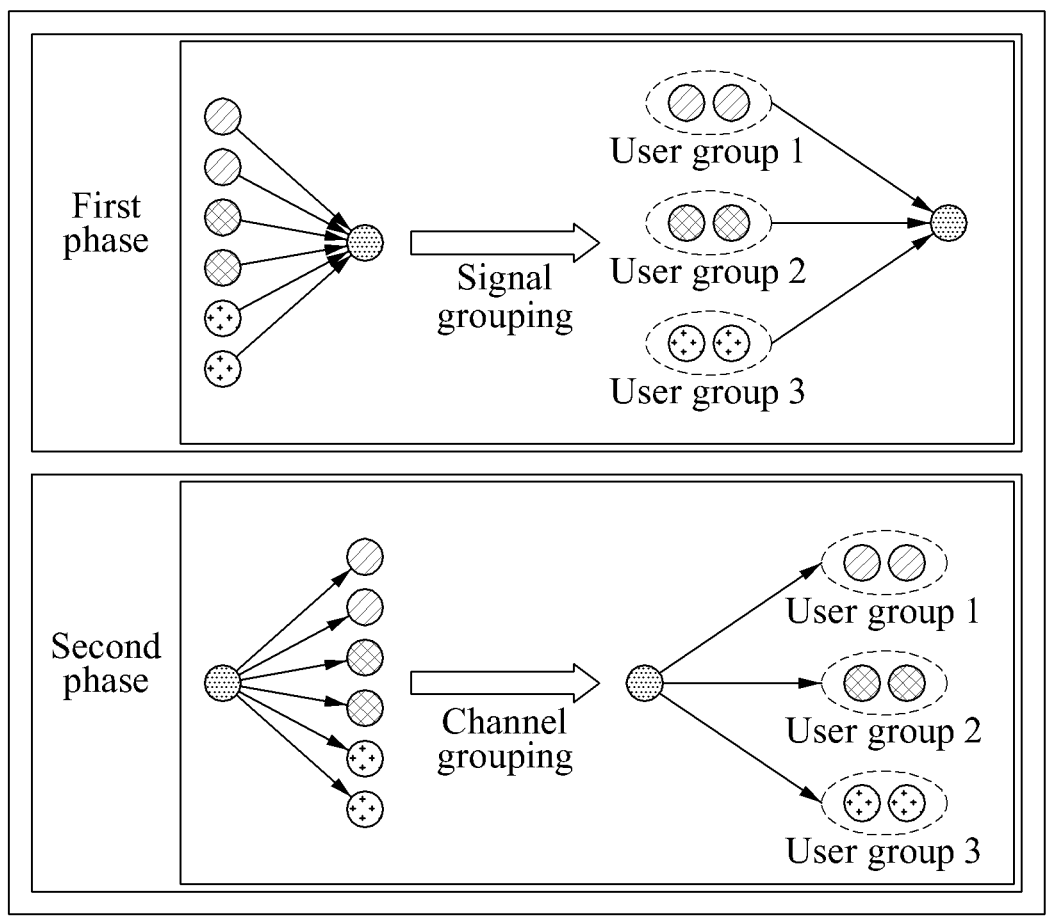
FIG. 2 is a diagram illustrating a method of grouping terminals into the plurality of transmit-and-receive pairs illustrated in the example embodiment of the network of FIG. 1.

The relay 120 groups the terminals 101, 103, 105, 107, 109, and 111 that perform signal transmission and reception with each other, as shown in FIG. 2, into the plurality of transmit-and-receive pairs, so as to exchange multiple two-way data via a multi-pair two-way relay channel during two time slots, simultaneously.

FIG. 2 is a diagram illustrating a method of grouping terminals into the plurality of transmit-and-receive pairs illustrated in the example embodiment of the network of FIG. 1. Referring to FIG. 2, different nodes may correspond to different terminals or users, and nodes having the same pattern may denote a transmit-and-receive pair that exchanges data or a signal with each other.

When different nodes are to exchange signals via a two-way relay channel, the relay receives two signals, that is, a transmission signal transmitted from a transmission node and a reception signal transmitted from a reception node, simultaneously, in a first phase. In this example, the first phase is a medium access control (MAC) phase. The relay that receives the two signals from different terminals, simultaneously, performs grouping of the signals as a transmission signal and a corresponding reception signal, so as to configure a transmit-and-receive pair A current physical-layer network coding scheme does not simultaneously process three or more signals that enter therein. Accordingly, three or more signals entering in the same dimension in the multi-pair two-way relay may not be preferred.

When three pairs of two-way relay channels exist, the relay secures at least three independent dimensions. Using a signal alignment scheme, the relay aligns and enables alignment of the signals transmitted from the respective three transmit-and-receive pairs into the independent dimensions.

In the first phase, K network coded signals corresponding to transmit-and-receive pairs, respectively, are generated. The relay determines reception beamforming vectors with respect to channel grouped transmit-and-receive pairs so that effective channels of terminals of a single transmit-and-receive pair are aligned in the same dimension in a second phase. The second phase is, for example, a broadcasting phase.

In the second phase, using a channel alignment scheme, the effective channels from the transmit-and-receive pairs to the relay are aligned in independent dimensions, respectively. In this example, effective channels obtained by applying reception beamforming vectors to two terminals of one of the transmit-and-receive pairs are aligned in the same dimension. Signals in the two terminals aligned in the same dimension are grouped into a single user group, that is, a single transmit-and-receive pair.

The above-described schemes are applied to a coordinated beamforming so that a plurality of transmit-and-receive pairs may exchange data quickly using a single relay having a plurality of transmit-and-receive antennas.

A communication method of a relay and a terminal in a network including a plurality of transmit-and-receive pairs and the relay including a plurality of antennas is applied to, for example, the exchange of data using an access point (AP), a mobile relay, or the like by a plurality of user pairs in a cell exchange data using a base station in a cellular system or a plurality of user pairs in an ad hoc network.

Figure 3:
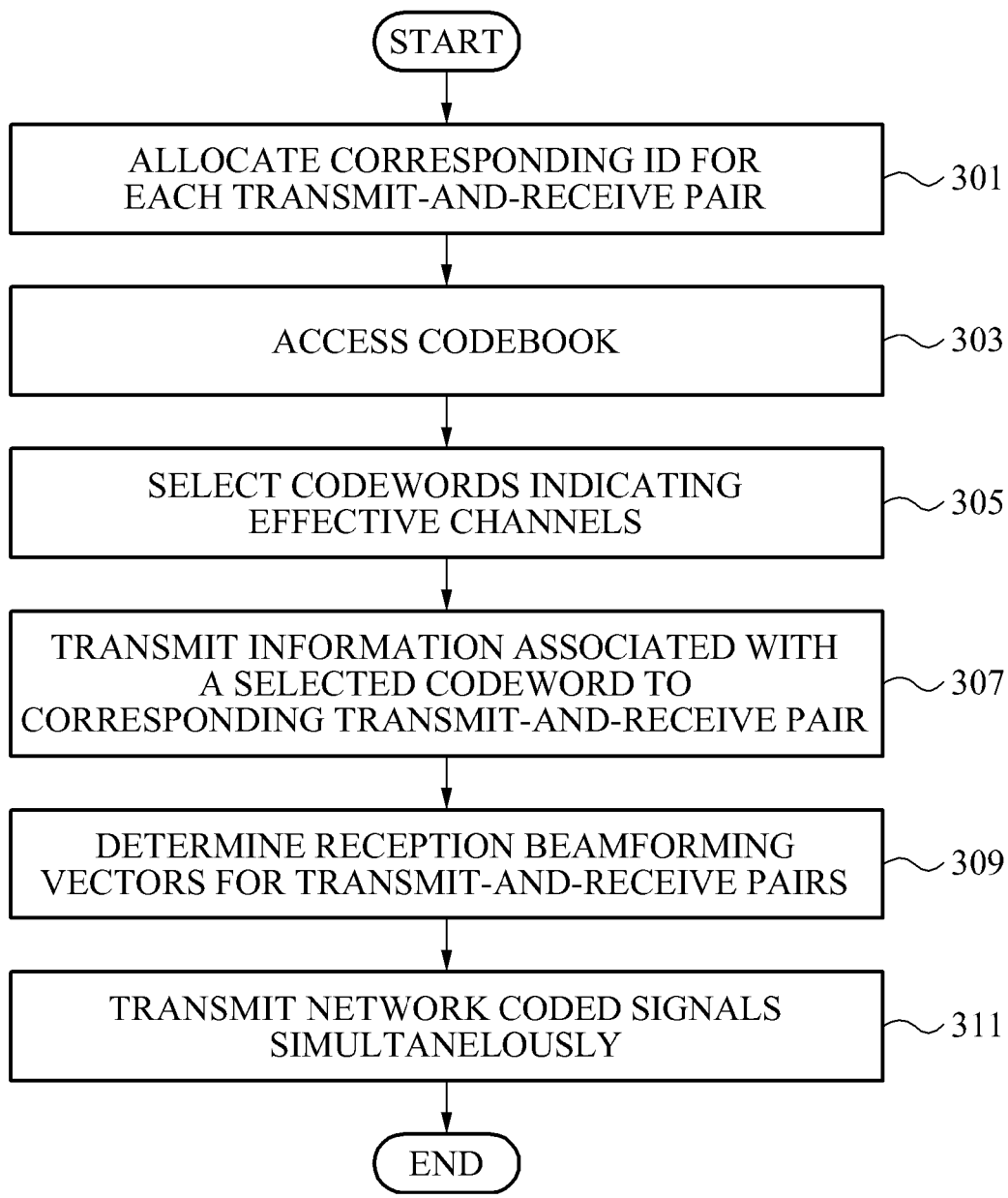
FIG. 3 is a flowchart illustrating, according to an example embodiment, a communication method of a relay of a network including a plurality of transmit-and-receive pairs, the relay including a plurality of antennas.

FIG. 3 is a flowchart illustrating, according to an example embodiment, a communication method of a relay of a network including K transmit-and-receive pairs, the relay including M antennas. Here, each terminal included in the K transmit-and-receive pairs includes N antennas.

In this example, the relay allocates (301) identifications (IDs) corresponding to the K transmit-and-receive pairs, respectively. The IDs allocated to the K transmit-and-receive pairs are used to determine a corresponding transmit-and-receive pair when the relay transmits information associated with a codeword selected from codewords included in a codebook. Although the relay does not determine transmission beamforming vectors for terminals of the K transmit-and-receive pairs, respectively, the terminals calculate transmission beamforming vectors when the relay informs the K transmit-and-receive pairs of information associated with corresponding codewords.

The relay accesses (303) the codebook. The codebook enables effective channels from the K transmit-and-receive pairs to the relay to be aligned in independent dimensions, respectively, when the K transmit-and-receive pairs transmit signals, simultaneously. In this example, each of the effective channels is aligned based on one of the codewords included in the codebook.

In this example, the terminals and the relay of the network are assumed to have the same codebook. The relay may newly define a codebook that enables the effective channels to be aligned in independent dimensions, and may transfer information associated with the codebook to all terminals in the network. The relay may inform the terminals of a new codebook each time a channel is changed. The relay selects (305), using the codebook, codewords indicating the effective channels from the K transmit-and-receive pairs to the relay, respectively.

The relay transmits (307) information associated with a selected codeword to a corresponding transmit-and-receive pair. The information associated with the selected codeword may be in a form of quantized index information, and the index information may be allocated for each ID, that is, for each transmit-and-receive pair. In this example, the relay transmits information to a corresponding transmit-and-receive pair associated with a codeword selected to be different for each ID.

Table 1 shows an example of the codebook.

based on an assumption that effective channels obtained by applying the reception beamforming vectors to the terminals of the transmit-and-receive pairs are identical to each other.

The relay transmits (311), to the K transmit-and-receive pairs, network coded signals for the K transmit-and-receive pairs, simultaneously. In this example, the network coding may include both a physical layer network coding and a structured network coding.

Figure 4:
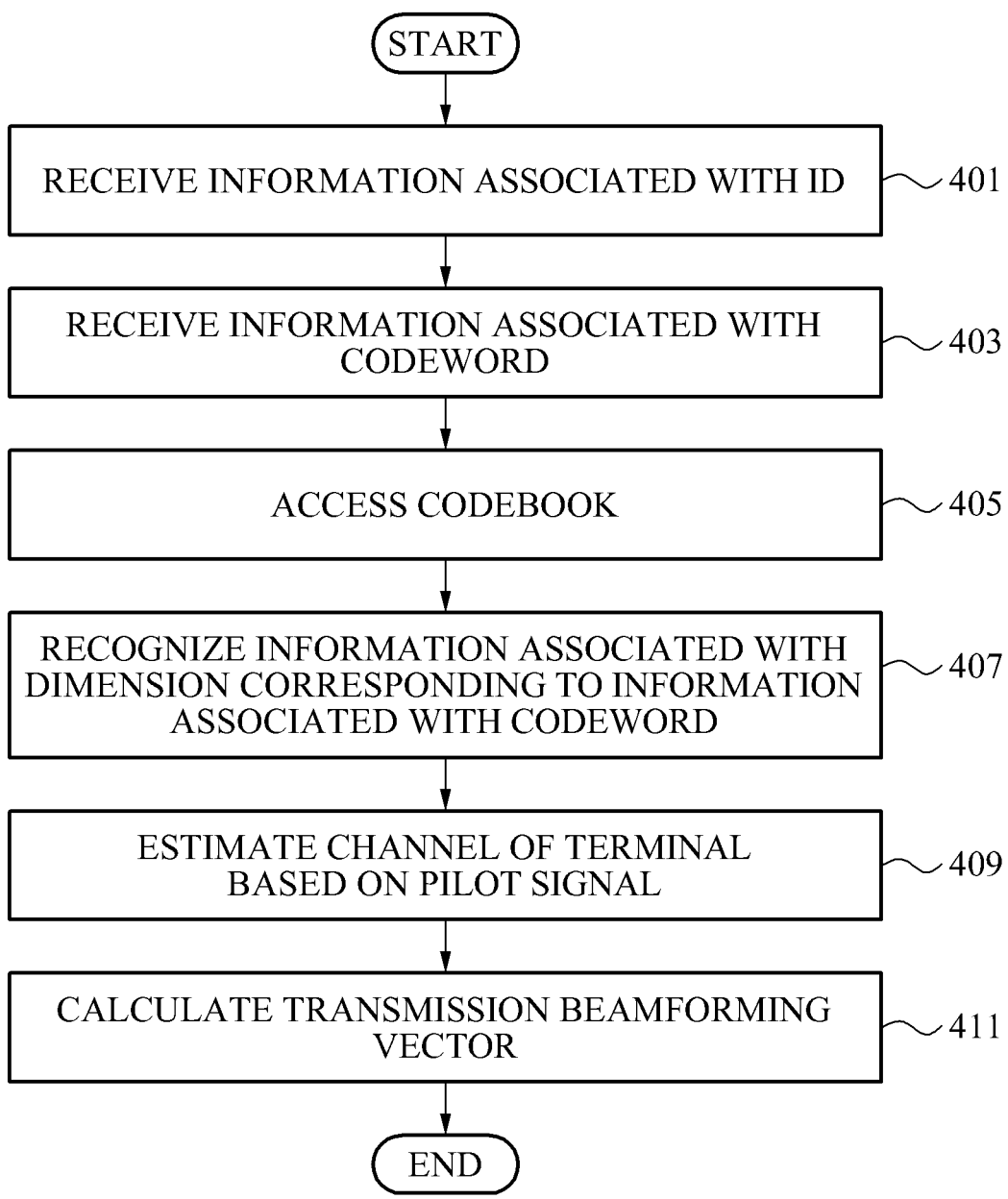
FIG. 4 is a flowchart illustrating, according to an example embodiment, a communication method of a terminal of a network including a plurality of transmit-and-receive pairs and a relay including a plurality of antennas.

FIG. 4 is a flowchart illustrating, according to an example embodiment, a communication method of a terminal of a network including K transmit-and-receive pairs and a relay including M antennas. Here, each terminal included in the K transmit-and-receive pairs includes N antennas.

The terminal receives (401) information associated with an ID from the relay. In this example, the information associated with the ID is allocated to correspond to a transmit-and-receive pair in which the terminal is included. That is, it is assumed the first terminal 101 and the fourth terminal 107 form a single transmit-and-receive pair, and the relay allocates ID 1 to the corresponding transmit-and-receive pair. In this example, the first terminal 101 receives information associated with an ID allocated to correspond to the transmit-and-receive pair in which the terminal is included. Here, the ID is ID 1.

The terminal receives (403), from the relay, information associated with a codeword. Information associated with codewords denotes effective channels from a corresponding

TABLE 1

| Index | 1 | 2 | 3 | 4 | 5 | 6 | 7 | 8 |
|---|---|---|---|---|---|---|---|---|
| Aligned space ($g_i$) | $\begin{bmatrix} 1/\sqrt{3} \\ 1/\sqrt{3} \\ 1/\sqrt{3} \end{bmatrix}$ | $\begin{bmatrix} -1/\sqrt{3} \\ 1/\sqrt{3} \\ 1/\sqrt{3} \end{bmatrix}$ | $\begin{bmatrix} 1/\sqrt{3} \\ -1/\sqrt{3} \\ 1/\sqrt{3} \end{bmatrix}$ | $\begin{bmatrix} 1/\sqrt{3} \\ 1/\sqrt{3} \\ -1/\sqrt{3} \end{bmatrix}$ | $\begin{bmatrix} 1/\sqrt{3} \\ -1/\sqrt{3} \\ -1/\sqrt{3} \end{bmatrix}$ | $\begin{bmatrix} -1/\sqrt{3} \\ 1/\sqrt{3} \\ -1/\sqrt{3} \end{bmatrix}$ | $\begin{bmatrix} -1/\sqrt{3} \\ -1/\sqrt{3} \\ 1/\sqrt{3} \end{bmatrix}$ | $\begin{bmatrix} -1/\sqrt{3} \\ -1/\sqrt{3} \\ -1/\sqrt{3} \end{bmatrix}$ |

As described in the foregoing, the codebook enables the alignment of the effective channels from the K transmit-and-receive pairs to the relay in the independent dimensions, respectively. Each index of Table 1 indicates a dimension or a direction to which a signal is to be aligned for each ID, that is, for each transmit-and-receive pair. Each index of Table 1 may denote a codeword indicating an independent dimension.

For example, it is assumed that the relay allocates an ID 1 to a transmit-and-receive pair including the first terminal 101 and the fourth terminal 107, and allocates an ID 2 to a transmit-and-receive pair including the second terminal 103 and the fifth terminal 109. In this example, the relay accesses a previously stored codebook to select effective channels associated respectively with the ID 1 and the ID 2 as codeword respectively corresponding to an index 1 and an index 3. The relay informs the corresponding transmit-and-receive pairs of the selected codewords, respectively. In this example, the effective channel associated with the ID 1 and the effective channel associated with the ID 2 indicates independent dimensions, respectively. In this example, signals among terminals of one of the K transmit-and-receive pairs may be aligned in the same dimension.

The relay determines (309) reception beamforming vectors for the K transmit-and-receive pairs, based on information associated with selected codewords. A method for the relay determining the reception beamforming vectors will be described in the forthcoming with reference to FIG. 5. In this example, the relay determines the reception beamforming vectors of the terminals of the K transmit-and-receive pairs transmit-and-receive pair among the K transmit-and-receive pairs to the relay. The terminal accesses (405) a codebook that enables the effective channels from the K transmit-and-receive pairs to the relay to be aligned in independent dimensions, respectively. Each of the effective channels is aligned based on one of codewords in the codebook.

The terminal recognizes (407), based on the codebook, information associated with an independent dimension corresponding to the information associated with the codeword. In this example, the codebook and the codeword are understood based on the descriptions associated with Table 1 provided in the foregoing. The terminal estimates (409) a channel of the terminal based on a pilot signal received from the relay. In this example, the terminal may estimate the channel by determining a channel through which the pilot signal is received. The terminal calculates (411) a transmission beamforming vector based on the information associated with the independent dimension and the information associated with the estimated channel.

Figure 5:
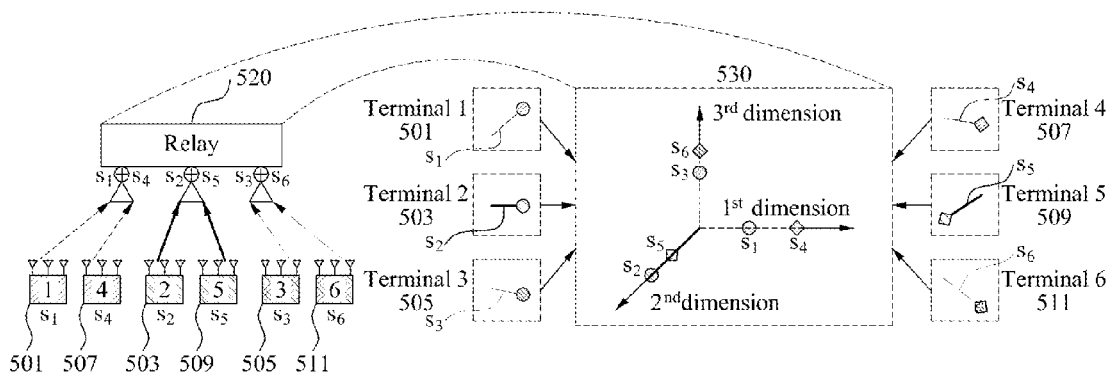
FIG. 5 is a diagram illustrating, according to an example embodiment, operations of terminals of a plurality of transmit-and-receive pairs and operations of a relay in a first phase of a network including the plurality of transmit-and-receive pairs, the relay including a plurality of antennas.

FIG. 5 is a diagram illustrating, according to an example embodiment, operations of terminals of a plurality of transmit-and-receive pairs and operations of a relay 520 in a first phase of a network including the plurality of transmit-and-receive pairs, the relay including a plurality of antennas.

As described in the foregoing, with reference to FIG. 5, in a two-way relay channel, when two different nodes have signals to exchange, the relay 520 receives a transmission signal transmitted from a transmission node and a reception signal transmitted from a reception node simultaneously in the first phase, which is, in this example, a MAC phase.

That is, the relay 520 receives a transmission signal $s_1$ of a first terminal 501, a reception signal $s_4$ of a fourth terminal 507, a transmission signal $s_2$ of a second terminal 503, a reception signal $s_5$ of a fifth terminal 509, a transmission signal $s_3$ of the third terminal 505, and a reception signal $s_6$ of a sixth terminal 511, simultaneously.

In this example, a condition that enables the relay 520 to perform signal alignment is as given in Equation 1.

$$\text{span}(H_{ri}V_i) = \text{span}(H_{rk}V_k) \quad \text{[Equation 1]}$$

where $i = 1, 2, \ldots K$ and $k = i + K$

Here, $H_{ri}$ denotes a channel matrix from an $i^{th}$ terminal included in K transmit-and-receive pairs to a relay, and $V_i$ denotes a transmission beamforming vector of the $i^{th}$ terminal. In addition, $H_{rk}$ denotes a channel matrix from a $k^{th}$ terminal included in the K transmit-and-receive pairs to the relay, and $V_k$ denotes a transmission beamforming vector of the $k^{th}$ terminal.

Span (·) denotes a space in which a column vector of a corresponding matrix is spanned. In this example, $H_{ri}$ is a square matrix and thus, may be spanned in all directions.

According to Equation 1, a result of spanning a channel from the first terminal 501 to the relay 520 and a transmission beamforming vector of the first terminal 501 may be equal to a result of spanning a channel from the fourth terminal 507 to the relay 520 and a transmission beamforming vector of the fourth terminal 507.

That is, a signal of the first terminal 501 and a signal of the fourth terminal 507 may exist in the same dimension.

In this example, Equation 1 may be modified as given in Equation 2.

$$g_i = H_{ri}v_i = H_{rk}v_k \quad \text{[Equation 2]}$$

In Equation 2, $g_i$ denotes an independent dimension allocated to the $i^{th}$ or the $k^{th}$ terminal of the transmit-and-receive pairs. Here, $i = 1, \ldots, K$, and $k = K+1, \ldots, 2K$.

In addition, Equation 2 may be modified as given in Equation 3.

$$v_i = H_{ri}^{-1} g_i$$

In this example, FIG. 1 illustrates that a number of antennas (M) included in a relay is three, and a number of antennas (N) in each terminal included in K transmit-and-receive pairs is assumed to be three. However, M and N are not limited thereto or to being equal. The Equations described in the foregoing are applicable to varied cases, such as, for example, a case in which N antennas in each terminal is two and M antennas included in a relay is three.

All channel matrices are square matrices and thus, Equation 2 and Equation 3 are valid in any independent dimension $g_i$ and in any channel matrix H.

When a predetermined $g_i$ exists, signals of uses of the $i^{th}$ or the $k^{th}$ terminal are aligned in a desired independent dimension in the first phase, such as, for example, a MAC phase.

Therefore, an example embodiment proposes a following protocol. The relay 520 allocates an index, such as, for example, a user pair index, for each K transmit-and-receive pair, and transmits an allocated index to a corresponding K transmit-and-receive pair, as described in the descriptions with reference to FIG. 3. In this example, the relay 520 additionally allocates an ID for each K transmit-and-receive pair. In this example, the index denotes a direction of alignment for each ID, that is, an independent dimension $g_i$.

Subsequently, the relay 520 calculates reception beamforming vectors based on an independent dimension $g_i$ that is predetermined for each K transmit-and-receive pair. The relay may perform reception beamforming with respect to K signals included in independent dimensions. The relay may determine reception beamforming vectors sensed based on the K signals as reception beamforming vectors for the K transmit-and-receive pairs.

In this example, the relay 520 calculates a reception beamforming vector $u_i$ with respect to K signals included in independent dimensions, based on a zero-forcing beamforming scheme, as given in Equation 4.

$$u_i = \text{null}([g_1 \ldots g_{i-1} g_{i+1} \ldots g_k]) \quad \text{[Equation 4]}$$

In Equation 4, null(A) denotes a normalized vector corresponding to a null space of a matrix A. The relay 520 determines $u_i$ so that the effective channels of the terminals are null as expressed by Equation 4. The relay 520 may separate independent dimensions to utilize a network coding scheme used in a two-way relay channel as is.

In a time division duplex (TDD) environment, previously estimated channels from the relay 520 to terminals of the K transmit-and-receive pairs may be utilized as channels in the first phase, that is, the MAC phase. Therefore, in the TDD environment, the relay 520 may dispersively determine which transmission beamforming vector is to be used in the first phase, based on H and a predetermined independent dimension $g_i$, as expressed by Equation 3.

Figure 6:
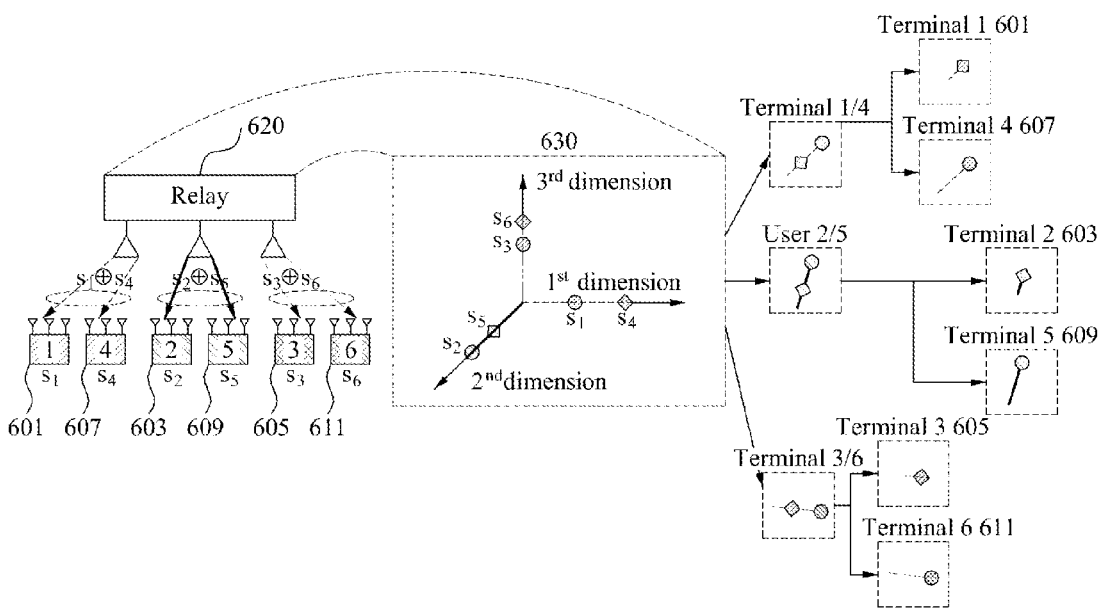
FIG. 6 is a diagram illustrating, according to an example embodiment, operations of terminals of a plurality of transmit-and-receive pairs and operations of a relay in a second phase of a network including the plurality of transmit-and-receive pairs, the relay including a plurality of antennas.

FIG. 6 is a diagram illustrating, according to an example embodiment, operations of terminals of a plurality of transmit-and-receive pairs and operations of a relay in a second phase of a network including the plurality of transmit-and-receive pairs, the relay including a plurality of antennas.

K network coded signals are generated in the first phase. As a result, the relay 620 transmits the K signals to K transmit-and-receive pairs. In the second phase, reception beamforming vectors for corresponding terminals are determined so that only the corresponding terminals of the K transmit-and-receive pairs receive the K network coded signals obtained in the first phase. The second phase is, for example, a broadcasting phase or the like.

When a number of N antennas of the relay 620 is greater than or equal to 2K, different signals are transmitted to the 2K terminals, respectively, using a reception beamforming vector recognized through a broadcasting channel. In this example, the reception beamforming vector recognized through the broadcasting channel is, for example, a distribution of power control (DPC) vector, a zero-forcing vector, or the like. In this example, when it is assumed that M=N=K=3, a terminal receives K independent signals.

In this example, the terminal senses a signal associated with the terminal readily by applying, to the K independent signals, a single-user multi-input and multi-output (MIMO) scheme, such as, for example, a zero-forcing (ZF) scheme, a minimum mean square error (MMSE) scheme, a maximum likelihood (ML) scheme, and the like.

Accordingly, the terminal may receive a single signal for the terminal. That is, the terminal may receive a desired signal by removing self-interference based on a physical-layer network coding scheme in a two-way relay. The descriptions provided in the foregoing may be expressed as shown in FIG. 6.

Referring to FIG. 6, according to an example embodiment, the K transmit-and-receive pairs, for example, a transmit-and-receive pair of a first terminal 601 and a fourth terminal 607, a transmit-and-receive pair of a second terminal 603 and a fifth terminal 609, and a transmit-and-receive pair of a third terminal 605 and a sixth terminal 611, receive the same network coded signal, respectively, through reception beamforming vectors determined by the relay 620.

In this example, terminals of the K transmit-and-receive pairs are a signal 630 corresponding to three signals, each associated with independent dimensions, respectively. In this example, the three signals are a signal for each transmit-and-receive pair, that is, a signal combining signals associated with the terminals of the K transmit-and-receive pairs. Therefore, each terminal may separate a signal for a corresponding terminal by applying, to the three independent signals, a ZF scheme, an MMSE scheme, an ML scheme, or the like.

That is, from the signal 630, the first terminal 601 receives a reception signal $s_4$, the fourth terminal 607 receives a reception signal $s_1$, the second terminal 603 receives a reception signal $s_5$, the fifth terminal 609 receives a reception signal $s_2$, the third terminal 605 receives a reception signal $s_6$, and the sixth terminal 611 receives a reception signal $s_3$, simultaneously. As a result, each terminal may receive a desired signal by removing self-interference.

Figure 7:
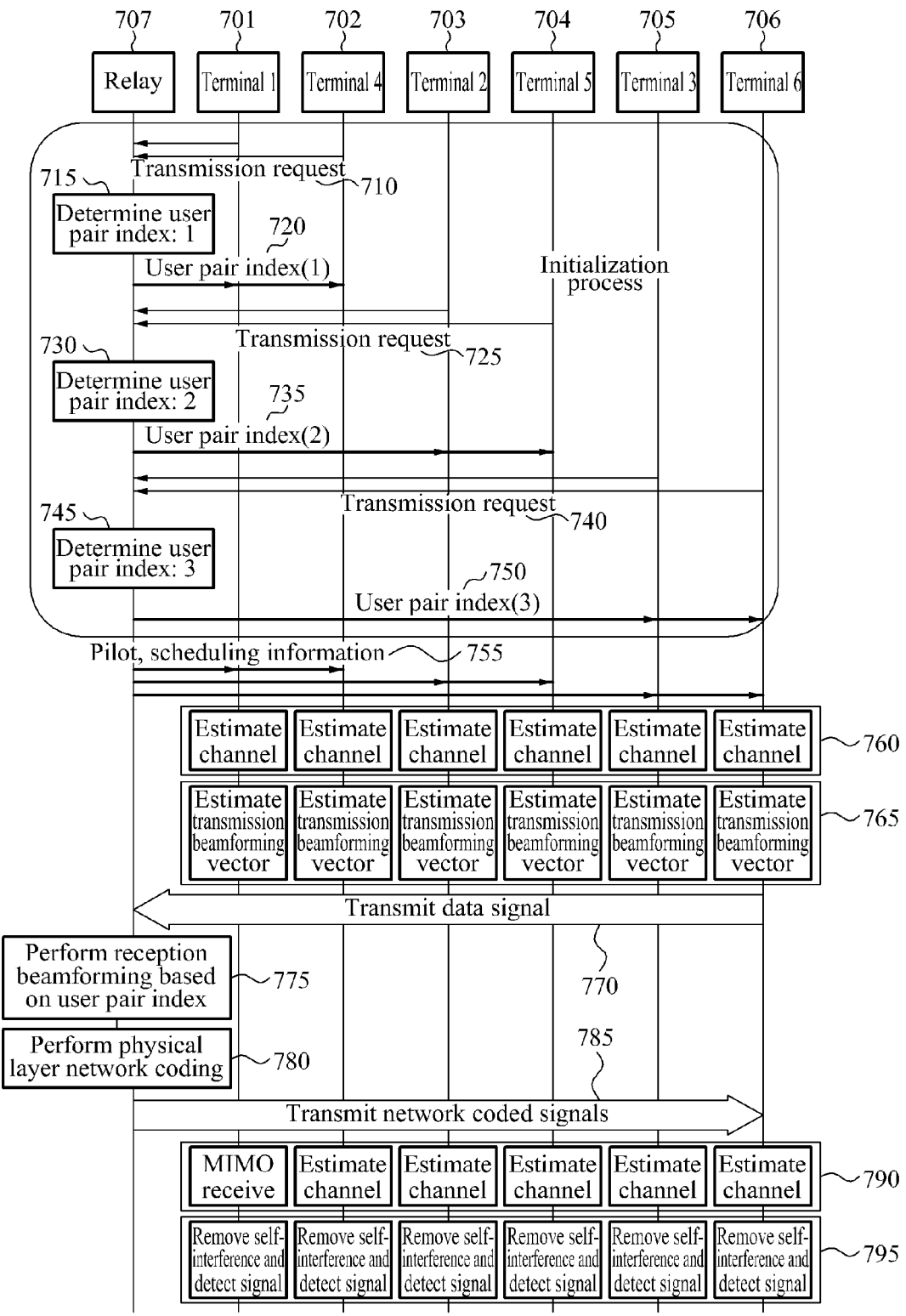
FIG. 7 is a diagram illustrating, according to an example embodiment, operations to perform communication between terminals of a plurality of transmit-and-receive pairs and a relay of a network including the plurality of transmit-and-receive pairs, the relay including a plurality of antennas.

FIG. 7 is a diagram illustrating, according to an example embodiment, operations to perform communication between terminals of a plurality of transmit-and-receive pairs and a relay of a network including the plurality of transmit-and-receive pairs, the relay including a plurality of antennas.

In this example, the network includes a first terminal 701, a second terminal 702, a third terminal 703, a fourth terminal 704, a fifth terminal 705, a sixth terminal 706, and a relay 707. In this example, the relay 707 includes three antennas. The first terminal 701 and the fourth terminal 704, the second terminal 702 and the fifth terminal 705, and the third terminal 703 and the sixth terminal 706 form user pairs, that is, K transmit-and-receive pairs. Each user pair exchanges signals to each other.

The relay 707 that receives a transmission request from each terminal, that is, the first terminal 701, the second terminal 702, the third terminal 703, the fourth terminal 704, the fifth terminal 705, and the sixth terminal 706, performs grouping of terminals into user pairs, that is, K transmit-and-receive pairs. In this example, the relay 707 determines an ID for each user pair.

Subsequently, the relay 707 informs terminals of each user pair of a corresponding user pair index. In this example, the user pair index may show an independent dimension $g_i$ predetermined in a codebook or the like for each ID of a user pair, such as, for example, a direction of alignment for signals for each ID. A scheme such as this one, which performs grouping of the terminals into user pairs, and informs each user pair of a corresponding ID, a corresponding user pair index, and the like, is referred to as an 'initialization process'.

The relay 707 that receives a transmission request 710 from the first terminal 701 and the fourth terminal 704 determines a user pair index for the first user 701 and the fourth user 704 in 715, and informs the first terminal 701 and the fourth terminal 704 of information associated with the determined user pair index in 720.

In 725 through 750, the relay 707 performs operations corresponding to operations in 710 and 720 with respect to the second terminal 702 and the fifth terminal 705, and the third terminal 703 and the sixth terminal 706. Operations in 710 through 750 of FIG. 7 correspond to the initialization process.

In 755, each of the terminals 701, 702, 703, 704, 705, and 706 receives a pilot signal and corresponding scheduling information from the relay 707. In this example, scheduling information includes an ID allocated to a user pair, codeword index information of a codebook associated with a user pair, information associated with an independent dimension $g_i$ previously determined for a user pair, or the like.

Each terminal estimates a channel of a corresponding terminal in 760, and calculates a transmission beamforming vector based on information associated with the estimated channel and the information associated with the independent dimension $g_i$ in 765. In 770, each terminal transmits data to the relay 707 based on a corresponding calculated transmission beamforming vector.

The relay 707 recognizes an independent dimension $g_i$ predetermined for each user pair based on index information associated with codewords in the codebook. In this example, the predetermined independent dimension $g_i$ indicates directions of effective channels of the terminals 701 to 706. As a result, the relay 707 determines reception beamforming vectors for the K transmit-and-receive pairs in 775.

The relay 707 generates network coded signals for the K transmit-and-receive pairs in 780, and transmits the network coded signals to the terminals 701 to 706, simultaneously, in 785. In 790, the terminals 701 to 706 receive the network coded signals from the relay 707, respectively, based on a MIMO scheme. In 795, each terminal detects a signal for a corresponding terminal by removing self-interference from the received network coded signal.

Figure 8:
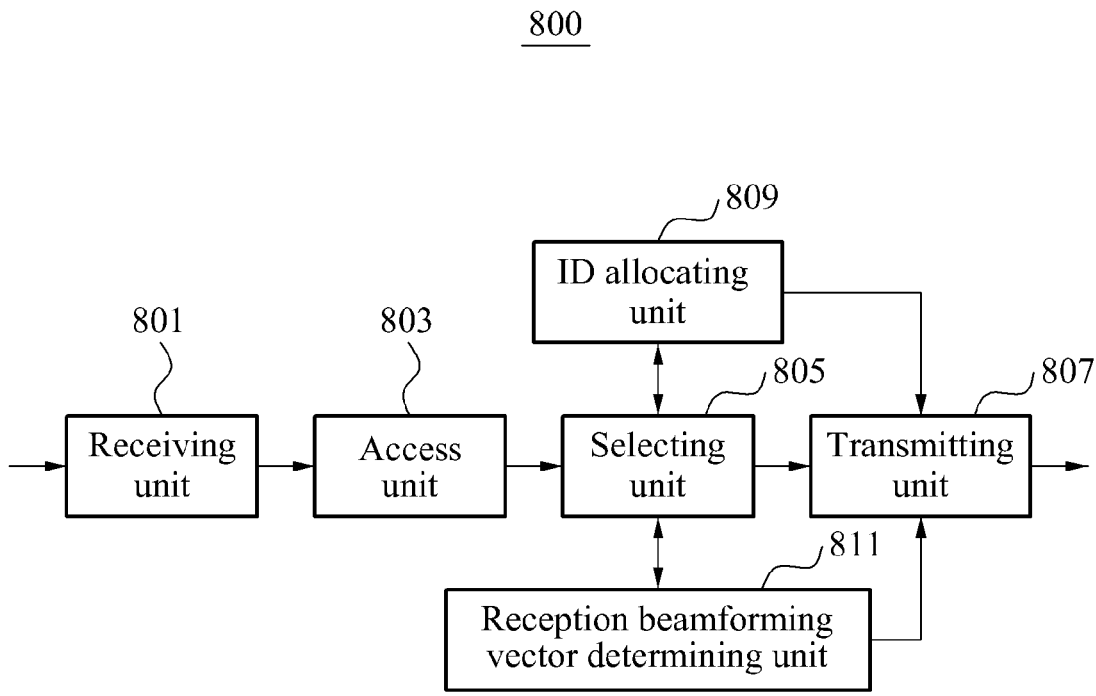
FIG. 8 is a block diagram illustrating, according to an example embodiment, a relay of a network including a plurality of transmit-and-receive pairs, the relay including a plurality of antennas.

FIG. 8 is a block diagram illustrating, according to an example embodiment, a relay 800 of a network including a plurality of transmit-and-receive pairs, the relay 800 including a plurality of antennas. In this example, the relay 800 includes a receiving unit 801, an access unit 803, a selecting unit 805, a transmitting unit 807, an ID allocating unit 809, and a reception beamforming vector determining unit 811.

The receiving unit 801 receives signals transmitted from the K transmit-and-receive pairs. The access unit 803 accesses a codebook that enables effective channels from the K transmit-and-receive pairs to the relay 800 to be aligned in independent dimensions when the K transmit-and-receive pairs transmit signals, simultaneously. In this example, each of the effective channels is aligned based on one of codewords included in the codebook.

The selecting unit 805 selects one or more of the codewords indicating the effective channels from the K transmit-and-receive pairs to the relays, respectively. As a result, signals among terminals of one of the K transmit-and-receive pairs may be aligned in the same dimension.

The transmitting unit 807 transmits information associated with the selected codewords to corresponding ones of the K transmit-and-receive pairs. In this example, the transmitting unit 807 transmits, to corresponding ones of the K transmit-and-receive pairs, information associated with the selected codewords that is different for each ID. Further, in this example, the transmitting unit 807 transmits network coded signals for the corresponding ones of the K transmit-and-receive pairs, simultaneously. The ID allocating unit 809 allocates IDs corresponding to the K transmit-and-receive pairs, respectively.

The reception beamforming vector determining unit 811 determines reception beamforming vectors for the corresponding ones of the K transmit-and-receive pairs, based on the associated with the selected codewords, respectively. In this example, the reception beamforming vector determining unit 811 may determine the reception beamforming vectors of the terminals of the corresponding ones of the K transmit-and-receive pairs, based on an assumption that effective channels obtained by applying the reception beamforming vectors to the terminals are identical to each other.

Figure 9:
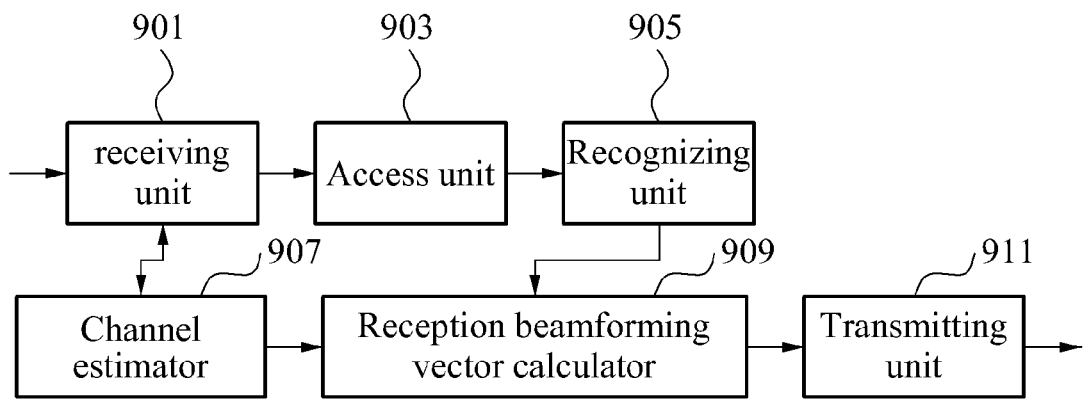
FIG. 9 is a block diagram illustrating, according to an example embodiment, a terminal of network including a plurality of transmit-and-receive pairs and a relay including a plurality of antennas.

FIG. 9 is a block diagram illustrating, according to an example embodiment, a terminal 900 of a plurality of terminals of network including a plurality of transmit-and-receive pairs and a relay including a plurality of antennas.

In this example, a terminal 900 includes a receiving unit 901, an access unit 903, a recognizing unit 905, a channel estimator 907, a transmission beamforming vector calculator 909, and a transmitting unit 911.

The receiving unit 901 receives, from the relay, information associated with a selected one of a plurality of codewords indicating an effective channel from a corresponding one of the K transmit-and-receive pairs to the relay. In this example, the receiving unit 901 may receive, from the relay, information associated with an ID allocated to correspond to one of the K transmit-and-receive pairs including the terminal 900 of the plurality of terminals.

The access unit 903 accesses a codebook including the plurality of codewords. The codebook enables effective channels from the K transmit-and-receive pairs to the relay to be aligned in independent dimensions, respectively. In this example, each of the effective channels is aligned based on one of the plurality of codewords.

The recognizing unit 905 recognizes information associated with one of the independent dimensions corresponding to the information associated with the selected one of the plurality of codewords, based on the codebook. The channel estimator 907 estimates a channel of the terminal 900 based on a pilot signal received from the relay.

The transmission beamforming vector calculator 909 calculates a transmission beamforming vector based on the information associated with the one of the independent dimensions and information associated with the estimated channel. The transmitting unit 911 transmits a signal to the relay based on the transmission beamforming vector. In this example, the signal received by the relay corresponds to signals aligned in independent dimensions, like the signal 530 illustrated in FIG. 5.

According to example embodiments, in a multi-pair two-way relay network, independent dimensions may be allocated for each transmit-and-receive pair, and a terminal may be informed of information associated with a corresponding independent dimension, such as, for example, a user pair index. As a result, overhead may be minimized based on the cooperation.

According to example embodiments, a relay transmits information associated with a codeword selected based on a codebook to a corresponding transmit-and-receive pair in a multi-pair two-way relay network. As a result, overhead caused by performing feed-forward of a transmission beamforming vector determined by the relay to a corresponding terminal may be reduced.

The units described herein may be implemented using hardware components and software components, such as, for example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. In addition, the described unit to perform an operation or a method may be hardware, software, or some combination of hardware and software. For example, the unit may be a software package running on a computer or the computer on which that software is running.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a relay of a network comprising K transmit-and-receive pairs of terminals, the relay comprising M antennas, each of the terminals comprising N antennas, the method comprising:
   accessing a codebook comprising codewords, the codebook being configured to enable effective channels from the K transmit-and-receive pairs to the relay to be aligned in independent dimensions, respectively, when the K transmit-and-receive pairs transmit signals simultaneously, each of the effective channels being aligned based on one of the codewords;
   selecting one or more of the codewords indicating the effective channels from the K transmit-and-receive pairs to the relay, respectively; and
   transmitting information associated with the selected codewords to corresponding ones of the K transmit-and-receive pairs.

2. The method of claim 1, further comprising:
   allocating identifications (IDs) corresponding to the K transmit-and-receive pairs, respectively.

3. The method of claim 2, wherein the selected codewords are different from each other for each ID.

4. The method of claim 1, further comprising:
   determining reception beamforming vectors with respect to the corresponding ones of the K transmit-and-receive pairs, based on the information associated with the selected codewords.

5. The method of claim 4, wherein the determining of the reception beamforming vectors comprises determining reception beamforming vectors of the terminals of the corresponding ones of the K transmit-and-receive pairs, based on an assumption that effective channels obtained by applying the reception beamforming vectors to the terminals are identical to each other.

6. The method of claim 1, further comprising:
   transmitting network coded signals for the corresponding ones of the K transmit-and-receive pairs, simultaneously.

7. The method of claim 1, further comprising:
   defining the codebook; and
   transferring information associated with the codebook to the terminals.

8. The method of claim 1, wherein signals among the terminals of one of the K transmit-and-receive pairs are aligned in the same independent dimension.

9. A non-transitory computer readable recording medium storing a program to implement the method of claim 1.

10. A communication method of a terminal of terminals in a network comprising K transmit-and-receive pairs of the terminals and a relay comprising M antennas, each of the terminals comprising N antennas, the method comprising:
    receiving, from the relay, information associated with a selected one codeword of codewords indicating an effective channel from a corresponding one of the K transmit-and-receive pairs to the relay;
    accessing a codebook comprising the codewords, the codebook being configured to enable effective channels from the K transmit-and-receive pairs to the relay to be aligned in independent dimensions, respectively, each of the effective channels being aligned based on one of the codewords;
    recognizing information associated with one of the independent dimensions corresponding to the information associated with the selected one codeword of the codewords, based on the codebook;
    estimating a channel of the terminal using a pilot signal received from the relay; and
    calculating a transmission beamforming vector based on the information associated with the one of the independent dimensions and information associated with the estimated channel.

11. The method of claim 10, further comprising:
    receiving, from the relay, information associated with identification (ID) allocated to correspond to one of the K transmit-and-receive pairs comprising the terminal of the terminals.

12. A relay of a network comprising K transmit-and-receive pairs of terminals, the relay comprising M antennas, each of the terminals comprising N antennas, the relay comprising:
    an access unit configured to access a codebook comprising codewords, the codebook being configured to enable effective channels from the K transmit-and-receive pairs to the relay to be aligned in independent dimensions, respectively, when the K transmit-and-receive pairs transmit signals simultaneously, each of the effective channels being aligned based on one of the codewords;
    a selecting unit configured to select one or more of the codewords indicating the effective channels from the K transmit-and-receive pairs to the relay, respectively; and
    a transmitting unit configured to transmit information associated with the selected codewords to corresponding ones of the K transmit-and-receive pairs.

13. The relay of claim 12, further comprising:
    an identification (ID) allocating unit configured to allocate IDs corresponding to the K transmit-and-receive pairs, respectively.

14. The relay of claim 13, wherein the selected codewords are different from each other for each ID.

15. The relay of claim 12, further comprising:
    a reception beamforming vector determining unit configured to determine reception beamforming vectors with respect to the corresponding ones of the K transmit-and-receive pairs, based on the information associated with the selected codewords.

16. The relay of claim 15, wherein the reception beamforming vector determining unit is further configured to determine reception beamforming vectors of the terminals of the corresponding ones of the K transmit-and-receive pairs, based on an assumption that effective channels obtained by applying the reception beamforming vectors to the terminals are identical to each other.

17. The relay of claim 12, wherein the transmitting unit is further configured to transmit network coded signals for the corresponding ones of the K transmit-and-receive pairs, simultaneously.

18. The relay of claim 12, wherein signals among the terminals of one of the K transmit-and-receive pairs are aligned in the same independent dimension.

19. A terminal of terminals of a network comprising K transmit-and-receive pairs of the terminals and a relay comprising M antennas, each of the terminals comprising N antennas, the terminal comprising:

a receiving unit configured to receive, from the relay, information associated with a selected one codeword of codewords indicating an effective channel from a corresponding one of the K transmit-and-receive pairs to the relay;

an access unit configured to access a codebook comprising the codewords, the codebook being configured to enable effective channels from the K transmit-and-receive pairs to the relay to be aligned in independent dimensions, respectively, each of the effective channels being aligned based on one of the codewords;

a recognizing unit configured to recognize information associated with one of the independent dimensions corresponding to the information associated with the selected one codeword of the codewords, based on the codebook;

a channel estimator configured to estimate a channel of the terminal based on a pilot signal received from the relay; and a transmission beamforming vector calculator configured to calculate a transmission beamforming vector based on the information associated with the one of the independent dimensions and information associated with the estimated channel.

20. The terminal of claim 19, wherein the receiving unit is further configured to receive, from the relay, information associated with identification (ID) allocated to correspond to one of the K transmit-and-receive pairs comprising the terminal of the terminals.

* * * * *